(12) United States Patent
Jang et al.

(10) Patent No.: US 9,334,440 B2
(45) Date of Patent: May 10, 2016

(54) PROCESSES FOR SYNTHESIZING NANOCRYSTALS AND NANOCRYSTAL COMPOSITIONS

(71) Applicant: SAMSUNG ELECTRONICS CO., LTD., Suwon-si, Gyeonggi-do (KR)

(72) Inventors: Eun Joo Jang, Suwon-si (KR); Hyo Sook Jang, Suwon-si (KR); Won Joo Lee, Pocheon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 200 days.

(21) Appl. No.: 13/904,724

(22) Filed: May 29, 2013

(65) Prior Publication Data

US 2014/0158937 A1 Jun. 12, 2014

(30) Foreign Application Priority Data

Dec. 7, 2012 (KR) .................. 10-2012-0142120

(51) Int. Cl.
| | | |
|---|---|---|
| *C09K 11/02* | (2006.01) | |
| *B82B 3/00* | (2006.01) | |
| *B82Y 20/00* | (2011.01) | |
| *B82Y 40/00* | (2011.01) | |

(52) U.S. Cl.
CPC .............. *C09K 11/025* (2013.01); *B82B 3/00* (2013.01); *B82Y 20/00* (2013.01); *B82Y 40/00* (2013.01); *Y10S 977/774* (2013.01); *Y10S 977/892* (2013.01); *Y10S 977/95* (2013.01)

(58) Field of Classification Search
CPC .... B82B 3/00; C09K 11/025; Y10S 977/774; Y10S 977/892; Y10S 977/95; B82Y 20/00
See application file for complete search history.

(56) References Cited

U.S. PATENT DOCUMENTS

| | | | |
|---|---|---|---|
| 7,850,777 B2 * | 12/2010 | Peng et al. ............... | 117/68 |
| 2005/0012182 A1 | 1/2005 | Jang et al. | |
| 2007/0289491 A1 | 12/2007 | Peng et al. | |
| 2008/0124268 A1 | 5/2008 | Yang et al. | |
| 2008/0138514 A1 | 6/2008 | Jang et al. | |
| 2008/0305334 A1 | 12/2008 | Jang et al. | |
| 2010/0159248 A1 * | 6/2010 | Jang et al. ............... | 428/403 |
| 2011/0240922 A1 | 10/2011 | Jun et al. | |
| 2011/0315954 A1 | 12/2011 | Jang et al. | |

FOREIGN PATENT DOCUMENTS

| | | |
|---|---|---|
| JP | 2005187314 A | 7/2005 |
| KR | 1020050010336 A | 1/2005 |
| KR | 1020070058072 A | 6/2007 |
| KR | 1020080107578 A | 12/2008 |
| KR | 1020090019781 A | 2/2009 |
| KR | 1020100097471 A | 9/2010 |
| KR | 1020110006977 A | 1/2011 |
| KR | 1020110108954 A | 10/2011 |
| KR | 1020110140049 A | 12/2011 |

OTHER PUBLICATIONS

I. Bedja, "FeS2 quantum dots sensitized nanostructured TiO2 solar cell: photoelectrochemical and photoinduced absorption spectroscopy studies," Materials Science-Poland, vol. 29, Issue 3, (2012), pp. 171-176.
Sreeram Cingarapu et al., "Synthesis of Indium Nanoparticles: Digestive Ripening under Mild Conditions," Inorganic Chemistry, vol. 50, Apr. 26, 2011, pp. 5000-5005.
Shreyas S. Kher et al., "A Straightforward, New Method for the Synthesis of Nanocrystalline GaAs and GaP," Chem. Mater., 1994, vol. 6, No. 11, pp. 2056-2062.
Byong Kee Moon et al., "Spectroscopy of nanocrystalline TiO2:Eu3+ phosphors," Science Direct, Colloids and Surfaces A: Physicochem. Eng. Aspects, 313-314, 2008, pp. 82-86.
Jongnam Park et al., "Synthesis of Monodisperse Spherical Nanocrystals," Angew. Chem. Int. Ed., 2007, vol. 46, pp. 4630-4660.
Taekyung Yu et al., "Various-Shaped Uniform Mn3O4 Nanocrystals Synthesized at Low Temperature in Air Atmosphere," Chem. Mater., 2009, vol. 21, No. 11, pp. 2272-2279.
Qi-Xian Zhang et al., "Study on optical properties associated with intrinsic defects in GaP nanoparticles," IOP Publishing, Journal of Physics D: Applied Physics, vol. 41, 2008, 185403, pp. 1-6.
English Translation of Korean Office Action dated Feb. 12, 2016.

\* cited by examiner

*Primary Examiner* — Carol M Koslow
(74) *Attorney, Agent, or Firm* — Cantor Colburn LLP

(57) ABSTRACT

A process of synthesizing nanocrystals, the process including contacting a first precursor, a ligand compound, and a second precursor in a solvent having a boiling point of less than or equal to about 150° C. and a polarity index of less than or equal to 5, and performing a thermal decomposition reaction between the first precursor and the second precursor at a higher pressure than atmospheric pressure and at a higher temperature than a boiling point of the solvent, wherein at least one of the first precursor and the second precursor is a metal-containing precursor.

19 Claims, 12 Drawing Sheets

| | solvent | absorption spectrum peak wavelength |
|---|---|---|
| Comparative Example 1 | ODE | 532nm |
| Example 1 | octane | 570nm |
| Example 2 | toluene | 537nm |

US 9,334,440 B2

PROCESSES FOR SYNTHESIZING NANOCRYSTALS AND NANOCRYSTAL COMPOSITIONS

CROSS-REFERENCE TO RELATED APPLICATION

This application claims priority to and the benefit of Korean Patent Application No. 10-2012-0142120 filed on Dec. 7, 2012, and all the benefits accruing therefrom under 35 U.S.C. §119, the content of which is incorporated herein in its entirety by reference.

BACKGROUND

1. Field

A process for synthesizing nanocrystals and a composition including nanocrystals synthesized therefrom are disclosed.

2. Description of the Related Art

Nanoparticles have drawn much attention due to the fact that unlike bulk materials, their physical characteristics (e.g., energy bandgap and melting point) may be controlled by changing the particle size. For example, a gold nanoparticle has a different melting point, color, and light emitting characteristics from those of bulk gold. Similarly, a semiconductor nanocrystal (also known as a quantum dot), a semiconductor material having a crystalline structure of a size of several nanometers, has a large surface area per unit volume. In addition, a semiconductor nanocrystal exhibits a quantum confinement effect, and thus has physicochemical characteristics different from the characteristics of the bulk material. A quantum dot may absorb light from an excitation source, and may emit energy corresponding to its energy bandgap. In the quantum dot, the energy bandgap may be adjusted by varying the size and/or the composition of the nanocrystal to obtain light emitting characteristics of high color purity. Various applications of the semiconductor nanocrystal in a display element, an energy device, a bio-light emitting element, or the like have been researched.

A semiconductor nanocrystal (i.e., a quantum dot) may be synthesized by a vapor deposition method such as metal organic chemical vapor deposition ("MOCVD") and molecular beam epitaxy ("MBE"), or by a wet chemical method of adding a precursor to an organic solvent to grow crystals. In the wet chemical method, an organic material such as an organic solvent, and the like, is coordinated to a surface of the semiconductor crystal during the crystal growth. Thereby the organic material plays a role of a dispersing agent and controls the crystal growth. Therefore, the nanocrystals produced by the wet chemical method usually have more similar size and shape than those produced by the vapor deposition method.

Unlike the bulk material, the inherent physical characteristics (such as energy bandgap, melting point, and the like) of the nanocrystal may vary depending on the size of the nanocrystal. In particular, the fact that the electromagnetic characteristics of the nanocrystal may be finely tuned makes attractive its use in various display devices and new regeneration energy devices. The devices including nanocrystals are expected to show higher efficiency and longer product lifespan. To promote the utilization of the nanocrystals, however, it is desired to establish technologies for synthesizing high quality nanocrystals with desirable physical and chemical properties by adjusting the size, structure, shape, and uniformity of the nanocrystals.

SUMMARY

An embodiment provides a process of synthesizing high quality nanocrystals.

Another embodiment provides a composition including a nanocrystal synthesized according to the process.

According to an embodiment, provided is a process of synthesizing nanocrystals, the process including:

contacting a first precursor, a ligand compound, and a second precursor in a solvent having a boiling point of less than or equal to about 150° C. and a polarity index of less than or equal to 5; and performing a thermal decomposition reaction of the first precursor and the second precursor at a higher pressure than atmospheric pressure and at a higher temperature than the boiling point of the solvent, wherein at least one of the first precursor and the second precursor is a metal-containing precursor.

The thermal decomposition reaction may be performed at a temperature of greater than or equal to about 180° C.

The solvent having a boiling point of less than or equal to about 150° C. and a polarity index of less than or equal to 5 may be selected from an alkane having less than or equal to 10 carbon atoms, a cycloalkane having less than or equal to 9 carbon atoms, a C6 to C12 aromatic hydrocarbon, a halogenated hydrocarbon, an ether, a heterocyclic aromatic compound, a carboxylic acid having less than or equal to 4 carbon atoms, a ketone, a sulfoxide, an amide, an alkanenitrile compound having less than or equal to 6 carbon atoms, and a combination thereof.

The solvent may be selected from pentane, hexane, heptane, octane, nonane, decane, benzene, toluene, xylene, ethylbenzene, butylbenzene, diethylether, dibutylether, dichloromethane, chloroform, carbon tetrachloride, tetrachloroethylene, ethylacetate, butylacetate, methylethylketone, and a combination thereof.

The thermal decomposition reaction may be performed at a pressure of greater than or equal to about 2 bar.

The ligand compound may be selected from RCOOH, $RNH_2$, $R_2NH$, $R_3N$, RSH, $R_3PO$, $R_3P$, ROH, RCOOR' wherein R and R' are independently a C1 to C24 alkyl group or a C5 to C20 aryl group, and a combination thereof.

The metal-containing precursor may include a metal selected from Pd, Pt, Ni, Co, Rh, Ir, Fe, Ru, Au, Ag, Cu, a Group I metal, a Group II metal, a Group III metal, a Group IV metal, and a combination thereof, and the metal-containing precursor may be selected from a metal, an alkylated metal compound, a metal alkoxide, a metal carboxylate, a metal nitrate, a metal chlorate, a metal sulfate, a metal acetylacetonate, a metal halide, a metal cyanide, a metal hydroxide, a metal oxide, a metal peroxide, and a combination thereof.

The metal-containing precursor may be selected from palladium acetate, palladium chloride, tetrakis(triphenylphosphine)palladium, palladium acetylacetonate, platinum chloride, platinum acetylacetonate, tetrakis(triphenylphosphine) platinum, dichloro(ethylenediamine)platinum, nickel chloride, nickel acetate, nickel sulfide, nickel sulfate, nickel nitrate, nickel acetylacetonate, cobalt chloride, cobalt carbonyl, cobalt acetate, cobalt nitrate, cobalt acetylacetonate, cobalt sulfate, chloro(1,5-cyclooctadiene)rhodium dimer, rhodium acetylacetonate, rhodium chloride, rhodium nitrate, iridium acetylacetonate, iridium chloride, iron acetate, iron chloride, iron acetylacetonate, iron nitrate, ruthenium chloride, gold chloride, trichloro(pyridine)gold, silver nitrate, silver chloride, silver acetate, silver carbonate, silver cyanate, copper chloride, copper sulfate, copper acetate, dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, trimethyl gallium, triethylgallium, gallium acetylacetonate, gallium-3-chloride, gallium fluoride, gallium oxide, gallium nitrate, gallium sulfate, indium acetate, indium hydroxide, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, and a combination thereof.

The first precursor or second precursor may be a Group V or Group VI precursor, and the Group V or Group VI precursor may be selected from hexanethiol, octanethiol, decanethiol, dodecanethiol, hexadecanethiol, mercaptopropylsilane, sulfur-trioctylphosphine, sulfur-tributylphosphine, sulfur-triphenylphosphine, sulfur-trioctylamine, trimethylsilylsulfur, ammonium sulfide, sodium sulfide, selenium-trioctylphosphine, selenium-tributylphosphine, selenium-triphenylphosphine, tellurium-tributylphosphine, tellurium-triphenylphosphine, tristrimethylsilylphosphine, tris(dimethylamino)phosphine, triethylphosphine, tributylphosphine, trioctylphosphine, triphenylphosphine, tricyclohexylphosphine, arsenic oxide, arsenic chloride, arsenic sulfate, arsenic bromide, arsenic iodide, nitrous oxide, nitric acid, ammonium nitrate, and a combination thereof.

The nanocrystal may be selected from a metal nanocrystal and a semiconductor nanocrystal, wherein the metal nanocrystal may include a metal from Pd, Pt, Ni, Co, Rh, Ir, Fe, Ru, Au, Ag, Cu, and a combination thereof, and the semiconductor nanocrystal may be include at least one compound selected from a Group II-VI compound, a Group III-V compound, a Group IV-VI compound, a Group IV compound, a Group I-III-VI compound, and a combination thereof.

The Group II-VI compound may be selected from a binary element compound selected from CdSe, CdTe, ZnS, ZnSe, ZnTe, ZnO, HgS, HgSe, HgTe, MgSe, MgS, and a combination thereof, a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof, and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof; the Group III-V compound semiconductor may be selected from a binary element compound selected from GaN, GaP, GaAs, GaSb, AlN, AlP, AlAs, AlSb, InN, InP, InAs, InSb, and a combination thereof, a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof, and a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof;

the Group IV-VI compound may be selected from a binary element compound selected from SnS, SnSe, SnTe, PbS, PbSe, PbTe, and a combination thereof, a ternary element compound selected from SnSeS, SnSeTe, SnSTe, PbSeS, PbSeTe, PbSTe, SnPbS, SnPbSe, SnPbTe, and a combination thereof, or a quaternary element compound selected from SnPbSSe, SnPbSeTe, SnPbSTe, and a combination thereof; and the Group IV compound may be selected from a singular element compound selected from Si, Ge, and a combination thereof, or a binary element compound selected from SiC, SiGe, and a combination thereof.

The process may further include adding the first nanocrystal to a mixture of the first precursor, ligand compound, and second precursor, performing the thermal decomposition reaction in the presence of the first nanocrystal to prepare a synthesized nanocrystal, wherein the synthesized nanocrystal includes a core of the first nanocrystal and a shell part of the second nanocrystal disposed on the core.

The first nanocrystal may be selected from a metal nanocrystal and a semiconductor nanocrystal, wherein the metal nanocrystal may be selected from Pd, Pt, Ni, Co, Rh, Ir, Fe, Ru, Au, Ag, Cu, and a combination thereof, and the semiconductor nanocrystal may be selected from a Group II-VI compound, a Group III-V compound, a Group IV-VI compound, a Group IV compound, a Group I-III-VI compound, and a combination thereof.

The process may further include adding a non-solvent to a product of the thermal decomposition reaction and separating a nanocrystal to which the ligand compound is coordinated.

The non-solvent may be selected from acetone, ethanol, butanol, isopropanol, ethanediol, water, tetrahydrofuran, dimethylsulfoxide, diethylether, formaldehyde, acetaldehyde, ethylene glycol, and a combination thereof.

The nanocrystal to which the ligand compound is coordinated may have a solvent content of less than or equal to about 20 weight %, based on the total weight of the nanocrystal and an organic material coordinated thereto, wherein the organic material includes the ligand compound and the solvent.

The nanocrystal to which the ligand compound is coordinated may have a solvent content of less than or equal to about 1 weight % based on the total weight of the nanocrystal and the organic material coordinated thereto.

The nanocrystal to which the ligand compound is coordinated may have a solvent content of less than or equal to about 0.1 weight % based on the total weight of the nanocrystal and the organic material coordinated thereto.

The nanocrystal may have a quantum efficiency of greater than or equal to about 40%, a full width at half maximum of a light emitting spectrum of less than or equal to about 50 nanometers, and a size distribution of less than or equal to about 10%.

According to another embodiment, provided is a nanocrystal composition including a metal nanocrystal or a semiconductor nanocrystal to a surface of which a ligand compound is coordinated, wherein the metal nanocrystal or the semiconductor nanocrystal to a surface of which the ligand compound is coordinated has a solvent content of less than or equal to about 20 weight %, based on the total weight of the metal nanocrystal or the semiconductor nanocrystal and an organic material coordinated thereto, wherein the organic material includes the ligand compound and the solvent.

The metal nanocrystal or the semiconductor nanocrystal to a surface of which the ligand compound is coordinated may have a solvent content of less than or equal to about 1 weight %, based on the total weight of the metal nanocrystal or the semiconductor nanocrystal and the organic material coordinated thereto.

The metal nanocrystal or the semiconductor nanocrystal to a surface of which the ligand compound is coordinated may have a solvent content of less than or equal to about 0.1 weight %, based on the total weight of the metal nanocrystal or the semiconductor nanocrystal and the organic material coordinated thereto.

The metal nanocrystal or the semiconductor nanocrystal may have a full width at half maximum of less than or equal to about 50 nanometers, a size distribution of less than or equal to about 10%, and a quantum efficiency of greater than or equal to about 40%.

The metal nanocrystal may be selected from Pd, Pt, Ni, Co, Rh, Ir, Fe, Ru, Au, Ag, Cu, and a combination thereof, and the semiconductor nanocrystal may be selected from a Group II-VI compound, a Group III-V compound, a Group IV-VI compound, a Group IV compound, a Group I-III-VI compound, and a combination thereof.

The ligand compound may be selected from RCOOH, $RNH_2$, $R_2NH$, $R_3N$, RSH, $R_3PO$, $R_3P$, ROH, RCOOR' (wherein R and R' are independently a C1 to C24 alkyl group or a C5 to C20 aryl group), and a combination thereof.

The metal nanocrystal or the semiconductor nanocrystal may include a core-shell structure.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
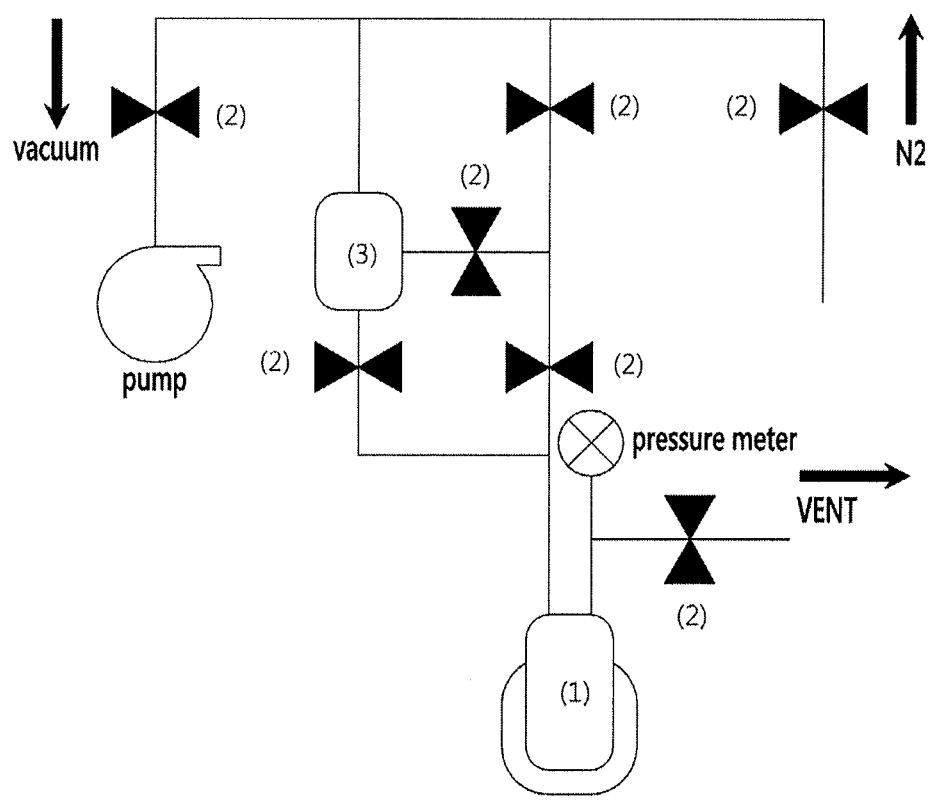
FIG. 1 shows the schematic structure of a high-pressure reactor for performing a process according to an embodiment.

This disclosure will be described more fully hereinafter in the following detailed description, in which some but not all embodiments of this disclosure are described. This disclosure may be embodied in many different forms and is not be construed as limited to the embodiments set forth herein; rather, these embodiments are provided so that this disclosure will fully convey the scope of the invention to those skilled in the art. Thus, in some exemplary embodiments, well known technologies are not specifically explained to avoid ambiguous understanding of the present invention. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising" will be understood to imply the inclusion of stated elements but not the exclusion of any other elements.

Unless specifically described to the contrary, a singular form includes a plural form.

The exemplary embodiments of the present invention described in the specification are explained referring to ideal exemplary drawings of schematic diagrams. Therefore, the parts exemplified in the drawings have outline properties and they are not to limit the categories of the invention. The same reference numerals designate the same constituent elements throughout the specification.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. Unless specified otherwise, the term "or" means "and/or."

"Alkyl" as used herein refers to a monovalent or a higher valency group derived from a straight or branched chain saturated aliphatic hydrocarbon, and having a specified number of carbon atoms.

"Aryl" as used herein refers to a monovalent or a higher valency group derived from a cyclic moiety in which all ring members are carbon and at least one ring is aromatic, and having a specified number of carbon atoms.

A process of synthesizing nanocrystals according to an embodiment includes contacting a first precursor, a ligand compound, and a second precursor in a solvent having a boiling point of less than or equal to about 150° C. and a polarity index of less than or equal to 5, and performing a thermal decomposition reaction between the first precursor and the second precursor at a higher pressure than atmospheric pressure and at a higher temperature than the boiling point of the solvent.

At least one of the first precursor and the second precursor is a metal-containing precursor.

The thermal decomposition reaction may be performed at a higher temperature than the boiling point of the solvent, for example greater than or equal to about 180° C., in some embodiments greater than or equal to about 200° C., and in other embodiments greater than or equal to about 210° C. The thermal decomposition reaction may be performed at a higher pressure than atmospheric pressure, for example, greater than or equal to about 2 bar, in some embodiments greater than or equal to about 3 bar, in other embodiments greater than or equal to about 4 bar, and in still other embodiments greater than or equal to about 5 bar. The pressurization may be accomplished by, for example, increasing a gas pressure of a reaction system higher than atmospheric pressure by using an inert gas such as nitrogen. The reaction pressure may be adjusted considering the boiling point of the solvent being used and the desired temperature at which the reaction occurs.

The solvent may be selected from an alkane having less than or equal to 10 carbon atoms, a cycloalkane having less than or equal to 9 carbon atoms, a C6 to C12 aromatic hydrocarbon, a halogenated hydrocarbon, an ether, a hetero aromatic cyclic compound, a carboxylic acid having less than or equal to 4 carbon atoms, a ketone, a sulfoxide, an amide, an alkanenitrile compound having less than or equal to 6 carbon atoms, and a combination thereof.

The solvent may be selected from pentane, hexane, heptane, octane, nonane, decane, benzene, toluene, xylene, ethylbenzene, butylbenzene, diethylether, dibutylether, dichloromethane, chloroform, carbon tetrachloride, tetrachloroethylene, ethylacetate, butylacetate, methylethylketone, and a combination thereof. The solvent may be used alone or in a mixture of two or more solvents.

In order to obtain a nanocrystal having a desired size and desired crystallinity through a wet chemical method, a high temperature reaction condition of greater than or equal to about 200° C. is generally desired. Accordingly, in a conventional process, an organic solvent having a high boiling point of greater than or equal to about 300° C., for example, a hydrophobic solvent having 18 to 24 carbon atoms such as trioctylamine ("TOA"), octadecene ("ODE"), trioctylphosphineoxide ("TOPO"), and the like, has been used. Most of the high boiling solvents have a high molecular weight and a high level of viscosity so they completely surround the ligands bonded to the nanocrystal and remain attached to the surfaces of nanoparticles after the synthesis of the nanoparticles. In addition, solvents having a suitable functional group in their chemical structure may form a chemical bond with the ligand or may form a polymer, thus making it difficult to remove the solvent from the nanocrystals after the synthesis. The organic materials surrounding the nano-particle (e.g., the ligand or the solvent) may improve efficiency or stability of a quantum dot. However, these organic materials may also have an adverse effect on the device life-span due to the modification of the quantum dot. Accordingly, it is desired to remove the organic materials from the quantum dot by means of a surface substitution or heat treatment. However, due to its high-boiling point, the high boiling solvent surrounding the nanocrystal particle may not be easily removed under a temperature at which the nanocrystals maintain their characteristics.

In addition, the semiconductor nanocrystals may be dispersed in a suitable organic or inorganic polymer resin and prepared in the form of a composite in order to secure the stability of the devices such as an LED or a solar cell, whenever the semiconductor nanocrystals are used therein. In such cases, the high boiling solvent remaining on the surface of nanoparticles may cause aggregation or form separate domains thereby causing an adverse effect on the dispersibility of the nanoparticles. The high boiling solvent being used in the synthesis of the nanoparticles is usually hydrophobic and has low polarity, while the organic polymers or the inorganic polymers such as silica that are used for the formation of the composite are hydrophilic and have high polarity index originated from their precursors. This fact may make the aforementioned problems more serious and significant. When the nanoparticles are aggregated, a polymer or a resin may not sufficiently encapsulate them and the stability of the composite may be compromised. In addition, the aggregation of the nanoparticles may cause a change in inherent characteristics of the nanoparticles such as a light emitting wavelength and the full width at half maximum. In addition, an excess amount of the organic material may decrease a curing degree of silica or a resin, leading to a lower stability of a device and making it difficult or even impossible to fabricate the device. Furthermore, the organic material on the surface of nanoparticles may be detached during the operation of the device, resulting in a decrease or a change in the device characteristics and a shorter life-span of the device. In order to address such problems, the nanoparticles are subjected to a consecutive washing or a surface substitution process so as to remove the high boiling solvent remaining on the surface thereof. Implementation of this procedure may decrease the amount of the organic material on the surface of the nanoparticles, but may simultaneously entail adverse effects such as a lower efficiency of light emission, more defects or traps, loss of ligands, lower stability, and surface oxidation.

In an embodiment, the aforementioned problems may be resolved by synthesizing nanocrystals through a pressurized reaction in the solvent having a boiling point of less than or equal to about 150° C. In this process, a temperature of a reaction system is allowed to increase above the boiling point of the solvent, and thus, even a low boiling point solvent may be utilized to carry out a high temperature reaction that is required for obtaining high quality nanocrystals. Accordingly, the amount of the solvent remaining on the surface of the crystals as prepared is very small and the solvent remaining on the surface may be readily removed by washing. In addition, the nanocrystals having a smaller amount of the organic material may maintain desired properties such as crystallinity, full width at half maximum, and particle size.

Furthermore, the nanocrystals may be synthesized at a higher temperature than the boiling point of the solvent so that they may have an improved level of crystallinity, desired sizes and shapes, and have fewer defects on the surface thereof. In particular, when the synthesized nanocrystals are utilized in a device in a solid state, it is possible to avoid degradation resulting from an extra amount of the solvent on the nanocrystals which may enhance the reliability of the nanocrystals.

In the aforementioned methods of synthesizing nanocrystals, the organic ligand compound is coordinated to the surface of the nanocrystals and thus plays a role in dispersing the nanocrystals uniformly in the solution and maintaining light-emitting and electrical characteristics thereof. The ligand compound may be selected from $RCOOH$, $RNH_2$, $R_2NH$, $R_3N$, $RSH$, $R_3PO$, $R_3P$, $ROH$, $RCOOR'$ (wherein R and R' are independently a C1 to C24 alkyl group or a C5 to C20 aryl group), and a combination thereof. Examples of the organic ligand compound may include methanethiol, ethanethiol, propanethiol, butanethiol, pentanethiol, hexanethiol, octanethiol, dodecanethiol, hexadecanethiol, octadecanethiol, benzylthiol, methaneamine, ethaneamine, propaneamine, butaneamine, pentaneamine, hexaneamine, octaneamine, dodecaneamine, hexadecylamine, octadecylamine, dimethylamine, diethylamine, dipropylamine, methanic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, a phosphine such as methylphosphine, ethylphosphine, propylphosphine, butylphosphine, pentylphosphine, and the like, a phosphine compound or oxide compound such as methylphosphine oxide, ethylphosphine oxide, propylphosphine oxide, butylphosphine oxide, and the like, a diphenylphosphine, triphenylphosphine compound, or an oxide compound thereof, and the like. The organic ligand compound may be used alone or as a mixture of two or more compounds.

The metal-containing precursor is not particularly limited, and may be properly selected depending on kinds of the nanocrystals sought to be synthesized. In an embodiment, the metal-containing precursor may include a metal selected from Pd, Pt, Ni, Co, Rh, Ir, Fe, Ru, Au, Ag, Cu, a Group I metal, a Group II metal, a Group III metal, or a Group IV metal. These may be in a form of a metal element, e.g., a powder, or an organic or inorganic compound including at least one of the metals. Non-limiting examples of the organic or inorganic compound may include an alkylated metal compound such as diethyl cadmium, dimethyl zinc, and the like; a metal alkoxide such as zinc methoxide, zinc ethoxide, and the like; various metal salt compounds, for example a carboxylate, a nitrate, a perchlorate, a sulfate, an acetylacetonate, and the like; a metal halide, for example a metal chloride, a metal bromide, and a metal iodide; a metal cyanide; a metal hydroxide; or a metal oxide or peroxide. Examples of the metal-containing precursor may include palladium acetate, palladium chloride, tetrakis(triphenylphosphine)palladium, palladium acetylacetonate, platinum chloride, platinum acetylacetonate, tetrakis(triphenylphosphine)platinum, dichloro(ethylenediamine)platinum, nickel chloride, nickel acetate, nickel sulfide, nickel sulfate, nickel nitrate, nickel acetylacetonate, cobalt chloride, cobalt carbonyl, cobalt acetate, cobalt nitrate, cobalt acetylacetonate, cobalt sulfate, chloro(1,5-cyclooctadiene)rhodium dimer, rhodium acetylacetonate, rhodium chloride, rhodium nitrate, iridium acetylacetonate, iridium chloride, iron acetate, iron chloride, iron acetylacetonate, iron nitrate, ruthenium chloride, gold chloride, trichloro(pyridine)gold, silver nitrate, silver chloride, silver acetate, silver carbonate, silver cyanate, copper chloride, copper sulfate, copper acetate, dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, trimethyl gallium, triethyl gallium, gallium acetylacetonate, gallium-3-chloride, gallium fluoride, gallium oxide, gallium nitrate, gallium sulfate, indium acetate, indium hydroxide, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, and a combination thereof.

The first precursor or second precursor may be selected from a Group V and a Group VI precursor. The Group V or Group VI precursor may be selected from hexanethiol, octanethiol, decanethiol, dodecanethiol, hexadecanethiol, mercaptopropylsilane, sulfur-trioctylphosphine ("S-TOP"), sulfur-tributylphosphine ("S-TBP"), sulfur-triphenylphosphine ("S-TPP"), sulfur-trioctylamine ("S-TOA"), trimethylsilylsulfur, ammonium sulfide, sodium sulfide, selenium-trioctylphosphine ("Se-TOP"), selenium-tributylphosphine ("Se-TBP"), selenium-triphenylphosphine ("Se-TPP"), tellurium-tributylphosphine ("Te-TBP"), tellurium-triphenylphosphine ("Te-TPP"), tristrimethylsilylphosphine, tris(dimethylamino)phosphine, triethylphosphine, tributylphosphine, trioctylphosphine, triphenylphosphine, tricyclohexylphosphine, arsenic oxide, arsenic chloride, arsenic sulfate, arsenic bromide, arsenic iodide, nitrous oxide, nitric acid, ammonium nitrate, and a combination thereof.

The process may further include adding the first nanocrystal to a mixture of the first precursor, ligand compound, and second precursor. The first nanocrystal may be synthesized according to a general method or the process of synthesizing a semiconductor crystal according to an embodiment. The thermal decomposition reaction between the first precursor and the second precursor may be performed in the presence of a first nanocrystal to prepare a synthesized nanocrystal, and thereby the synthesized nanocrystal may have a core/shell structure including a core of the first nanocrystal and a shell of a second nanocrystal formed on the core. The first nanocrystal may be selected from a metal nanocrystal and a semiconductor nanocrystal, and details for the metal nanocrystal and the semiconductor nanocrystal are described hereafter.

The process of synthesizing nanocrystal may further include
adding a non-solvent to the thermal decomposition reaction product and
separating a nanocrystal to which the ligand compound is coordinated.

The non-solvent may be a polar solvent that may be mixed with the solvent used during the reaction, but is not capable of dispersing nanocrystals. The non-solvent may be selected depending on the types of the solvent which are suitable for use in the reaction, and may be selected from, for example, acetone, ethanol, butanol, isopropanol, ethanediol, water, tetrahydrofuran ("THF"), dimethylsulfoxide ("DMSO"), diethylether, formaldehyde, acetaldehyde, ethylene glycol, a solvent having a similar solubility parameter to the foregoing solvent, and a combination thereof. The separation may be performed using centrifugation, precipitation, chromatography, or distillation. The separated nanocrystals may be added into a washing solvent as needed. The washing solvent is not particularly limited, and may be a solvent having a similar solubility parameter to the ligand, for example hexane, heptane, octane, chloroform, toluene, benzene, and the like.

The nanocrystal may be selected from a metal nanocrystal and a semiconductor nanocrystal. The metal nanocrystal may be selected from Pd, Pt, Ni, Co, Rh, Ir, Fe, Ru, Au, Ag, Cu, and a combination thereof. The semiconductor nanocrystal may include at least one compound selected from a Group II-VI compound, a Group III-V compound, a Group IV-VI compound, a Group IV compound, and a Group I-III-VI compound.

The Group II-VI compound may be selected from
a binary element compound selected from CdSe, CdTe, ZnS, ZnSe, ZnTe, ZnO, HgS, HgSe, HgTe, MgSe, MgS, and a combination thereof;
a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and
a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compound semiconductor may be selected from
a binary element compound selected from GaN, GaP, GaAs, GaSb, AlN, AlP, AlAs, AlSb, InN, InP, InAs, InSb, and a combination thereof;
a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; and
a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from
a binary element compound selected from SnS, SnSe, SnTe, PbS, PbSe, PbTe, and a combination thereof;
a ternary element compound selected from SnSeS, SnSeTe, SnSTe, PbSeS, PbSeTe, PbSTe, SnPbS, SnPbSe, SnPbTe, and a combination thereof; and
a quaternary element compound selected from SnPbSSe, SnPbSeTe, SnPbSTe, and a combination thereof.

The Group IV compound may be a singular element compound selected from
Si, Ge, and a combination thereof; and
a binary element compound selected from SiC, SiGe, and a combination thereof.

The semiconductor nanocrystal may include at least two kinds of compounds. The binary element compound, ternary element compound, or quaternary element compound may be present in a form of an alloy, or in a form of a structure wherein at least two different crystalline structures coexist as layers such as a core/shell or as compartments such as multipod.

The nanocrystal having the ligand compound coordinated thereto may include a solvent in an amount of less then or equal to about 20 percent by weight ("weight %"), in some embodiments less than or equal to about 1 weight %, and in other embodiments less than or equal to about 0.1 weight % based on the total weight of the nanocrystal and an organic material coordinated thereto,
wherein the organic material includes the ligand compound and the solvent.

The nanocrystal may have quantum efficiency of greater than or equal to about 40%, a full width at half maximum of a light emitting spectrum of less than or equal to about 50 nanometers ("nm"), and a size distribution (standard deviation) of less than or equal to about 10%.

The nanocrystal composition according to another embodiment may be a nanocrystal composition including a metal nanocrystal or a semiconductor nanocrystal to a surface of which a ligand compound is coordinated,
wherein the metal nanocrystal or the semiconductor nanocrystal having the ligand compound coordinated to its surface has a solvent content of less than or equal to about 20 weight %, in some embodiments less than or equal to about 1 weight %, and in other embodiments less than or equal to about 0.1 weight %, based on the total weight of the nanocrystal, and an organic material coordinated to a surface of the nanocrystal,
wherein the organic material includes the ligand compound and the solvent.

The metal nanocrystal or the semiconductor nanocrystal may have quantum efficiency of greater than or equal to about 30%, in some embodiments greater than or equal to about 44%, may have a full width at half maximum of a light emitting spectrum of less than or equal to about 50 nm, in some embodiments of less than or equal to about 45 nm, and may have a size distribution (standard deviation) of less than or equal to about 10%, and in some embodiments less than or equal to about 5%. The metal nanocrystal or semiconductor nanocrystal having the ligand compound coordinated thereto may be substantially free of a substance detected at a temperature of less than or equal to about 150° C. in an evolved gas analysis.

The ligand compound, and the metal nanocrystal or semiconductor nanocrystal may be the same as described above.

The metal nanocrystal or the semiconductor nanocrystal may have a size of about 1 nm to about 100 nm, and in some embodiments about 1 nm to about 20 nm.

The metal nanocrystal may be selected from Pd, Pt, Ni, Co, Rh, Ir, Fe, Ru, Au, Ag, Cu, and a combination thereof, and the semiconductor nanocrystal may be selected from a Group II-VI compound, a Group III-V compound, a Group IV-VI compound, a Group IV compound, a Group I-III-VI compound, and a combination thereof.

The ligand compound may be selected from RCOOH, $RNH_2$, $R_2NH$, $R_3N$, RSH, $R_3PO$, $R_3P$, ROH, RCOOR'

(wherein R and R' are independently a C1 to C24 alkyl group or a C5 to C20 aryl group), and a combination thereof.

The metal nanocrystal or the semiconductor nanocrystal may include a core-shell structure.

The shapes of the semiconductor nanocrystal are not particularly limited. For example, the semiconductor nanocrystal may be a spherical shaped, a pyramid shaped, a multi-arm shaped, or a cubic shaped nanoparticle, nanotube, nanowire, nanofiber, nano-sheet particle, and the like.

The semiconductor nanocrystal composition being synthesized in a solvent having a low boiling point under a high temperature/high pressure may have a desirable level of crystallinity and a desired particle size, and may include a smaller amount of solvent remaining on a surface after its synthesis. Accordingly, when the semiconductor nanocrystal composition is applied to a device, the number of the processes necessary for removing the surface organic material through a surface substitution or a high temperature treatment may be minimized, and thereby inherent properties of the semiconductor nanocrystal may be maintained. The semiconductor nanocrystal compositions may find their utility in various fields such as a light emitting diode ("LED"), a solar cell, and a biosensor.

Hereinafter, the present invention is illustrated in more detail with reference to specific examples. However, they are exemplary embodiments of the present invention, and the present invention is not limited thereto.

EXAMPLES

A semiconductor nanocrystal is synthesized using a reactor schematically illustrated in FIG. 1. In FIG. 1, a metal precursor and a low boiling point solvent are put into a pressurized reactor (1), and oxygen is removed from the reactor (1) and an auxiliary reactor (3) by using a vacuum pump, and nitrogen is charged in these reactors. The temperature of the solvent may increase to a temperature higher than or equal to its boiling point under a pressurized condition obtained by increasing the nitrogen pressure in the pressurized reactor (1) up to higher than or equal to atmospheric pressure. The pressurized reactor (1) may be provided with an external heating jacket for controlling temperature and with an agitator for uniformly mixing the reactant during the reaction thereinside. The reactor may be provided with high pressure valves (2) and sealants so as to constantly maintain a pressure at a level of less than or equal to 100 atmosphere ("atm") and it may have an auxiliary reactor for injecting an additional precursor solution.

Example 1

Synthesis of InP Nanoparticle (1)

Figure 2:
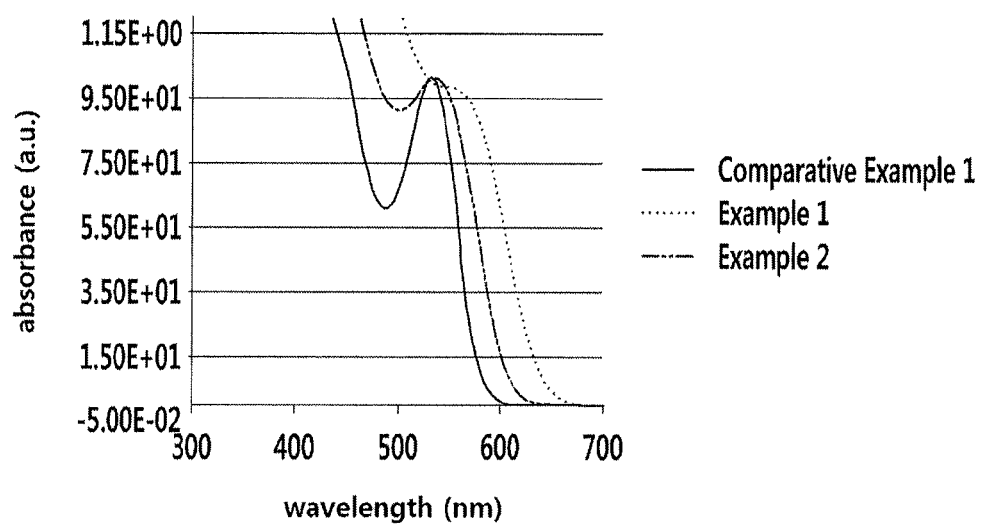
FIG. 2 is a graph of absorbance (arbitrary units, a. u.) versus wavelength (nanometer) showing the results of UV-Vis spectroscopy for the semiconductor nanocrystals synthesized in Examples 1 and 2 and Comparative Example 1.

(1) 1.6 millimoles ("mmol") of indium palmitate [$In(CH_3(CH_2)_{14}CO_2)_3$] and 80 milliliters ("ml") of octane are mixed, and the mixture is injected into a pressurized reactor (1). The pressurized reactor is sealed, and oxygen and air in the reactants and the pressurized reactor are removed using a vacuum pump for about 5 minutes. Next, nitrogen is injected into the reactor, the temperature of which is then increased up to 100° C. When the reactor (1) has a temperature of 100° C., an auxiliary reactor is filled with a solution prepared by mixing 0.8 mmol of tris(trimethylsilyl)phosphine ("$(TMS)_3P$") and 4 ml of trioctylphosphine ("TOP"), and is charged with nitrogen to have a pressure of 2 bar, and by using such pressure difference, the $(TMS)_3P$ solution may be rapidly injected into the pressurized reactor (1). After injecting the $(TMS)_3P$ solution, the reactor is pressurized with nitrogen to have a pressure of 5 bar and is heated to have a temperature of 180° C. to conduct a reaction for 1 hour. The reactants are stirred at about 700 rounds per minute ("rpm") throughout the reaction. FIG. 2 shows the absorption spectrum of the solution of the InP semiconductor nanocrystals as synthesized.

(2) The InP semiconductor nanocrystal is separated by centrifugation. Acetone or ethanol is added to the solution including the nanocrystals at room temperature to remove an organic material. The resulting solution is subjected to centrifugation for about 10 minutes to prepare InP semiconductor crystals as a precipitate. The semiconductor nanocrystals as prepared is subjected to a thermogravimetric analysis wherein the temperature increases at a speed of 10 degrees Centigrade per minute ("° C./min") from room temperature to 600° C. under a nitrogen atmosphere. The results are provided in FIG. 3 and the following Table 1.

(3) Inductively coupled plasma-atomic emission spectroscopy ("ICP-AES") is conducted for the InP semiconductor crystal. The results are provided in the following Table 2.

Figure 4:
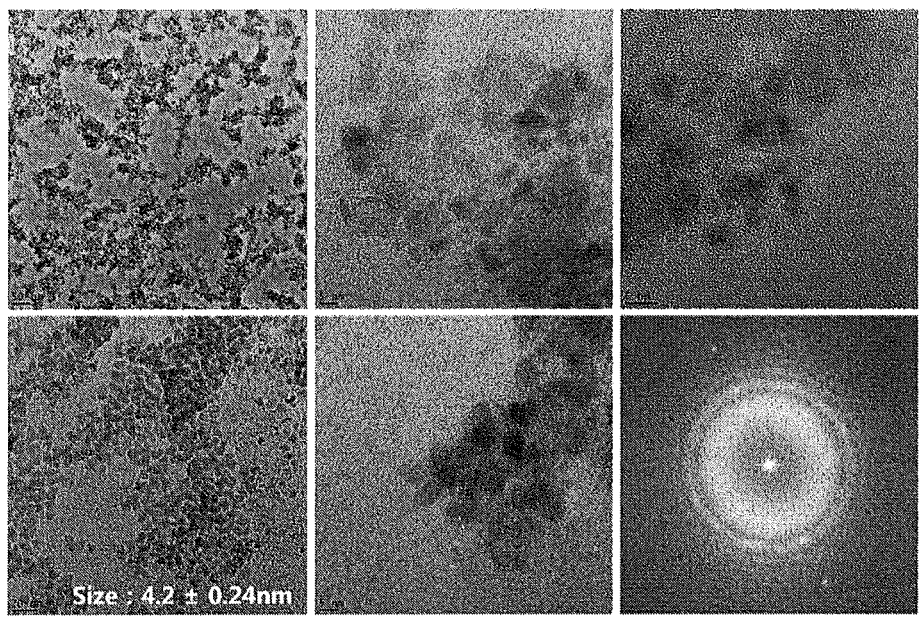
FIG. 4 shows TEM images of the semiconductor nanocrystal prepared according to Example 1.

(4) TEM and selected area diffraction ("SAED") analyses are conducted for the InP semiconductor nanocrystal. The results are provided in FIG. 4. The TEM and SAED images in FIG. 4 show the size and the crystallinity of the nanocrystal particles. The size and the crystallinity of the nanocrystal particles are not substantially different from those of nanocrystal particles synthesized at a temperature of greater than or equal to 280° C. by using a high boiling point solvent.

Example 2

Synthesis of InP Nanoparticle (2)

(1) InP semiconductor nanocrystals are synthesized in the same manner as set forth in Example 1, except for using 80 ml of toluene instead of octane as a solvent. FIG. 2 shows the absorption spectrum of the InP semiconductor nanocrystal solution as synthesized.

(2) The InP semiconductor nanocrystals as obtained above are separated in the same manner as set forth in Example 1 and the thermogravimetric analysis is conducted for them. The results are provided in FIG. 3 and the following Table 1.

(3) ICP-AES analysis is carried out for the InP semiconductor nanocrystals in the same manner as set forth in Example 1, and the results are provided in the following Table 2.

Comparative Example 1

Synthesis of InP Nanocrystal Using Solvent Having a High Boiling Point (1) InP semiconductor nanocrystals are synthesized by using the same compounds in the same amount as being used in Example 1 except for using a glass reactor and 80 ml of octadecene ("ODE") instead of octane as a solvent, setting a reaction temperature at 280° C., and carrying out the reaction under atmospheric pressure. FIG. 2 shows the absorption spectrum of the InP semiconductor nanocrystal solution as synthesized.

(2) The InP semiconductor nanocrystals as obtained above are separated in the same manner as set forth in Example 1 and the thermogravimetric analysis is conducted for them. The results are provided in FIG. 3 and Table 1.

(3) ICP-AES analysis is carried out for the InP semiconductor nanocrystals in the same manner as set forth in Example 1, and the results are provided in the following Table 2.

(4) The size of the nanocrystals is measured through the TEM image, and the standard deviation is calculated to provide a particle size distribution. The nanocrystal has a particle size of about 4.2±0.24 nm.

TABLE 1

| TGA | Solvent | Weight decrease rate at 500° C. (%) |
|---|---|---|
| Comparative Example 1 | Octadecene | 75 |
| Example 1 | Octane | 50 |
| Example 2 | Toluene | 46 |

Figure 3:
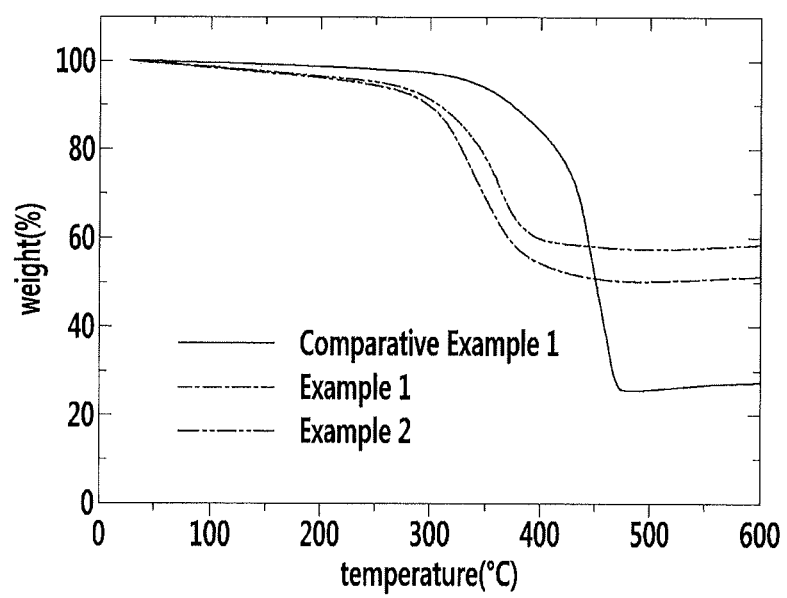
FIG. 3 is a graph of weight (percent, %) versus temperature (degree Centigrade, ° C.) showing the results of thermogravimetric analysis ("TGA") for the semiconductor nanocrystals synthesized according to Examples 1 and 2 and Comparative Example 1.

Based on the results of FIG. 3 and Table 1, the semiconductor nanocrystals of Examples 1 and 2 have an organic material content of 50% and 46% remaining on their surfaces, respectively. Such results are significantly lower than those of the nanocrystals obtained by the method of Comparative Example 1 (i.e., 75%), wherein octadecene (i.e., the high boiling point solvent) is used.

TABLE 2

| ICP-AES | In/P | P/P |
|---|---|---|
| Comparative Example 1 | 1.747 | 1.000 |
| Example 1 | 1.494 | 1.000 |
| Example 2 | 1.485 | 1.000 |

The ICP-AES results in Table 2 confirm that the nanocrystals prepared by using the low boiling solvent according to Examples 1 and 2 have a similar composition to the InP nanocrystals prepared by using the high boiling point solvent according to Comparative Example 1.

Example 3

Synthesis of CdSe(Core)/ZnS(Shell) Semiconductor Nanocrystal (1) Synthesis of CdSe Semiconductor Nanocrystal 0.1 mmol of CdO, 0.4 mmol of octadecyl phosphonic acid ("ODPA"), and 10 ml of trioctylamine ("TOA") are mixed, and the air and oxygen in the reactor, the precursors, and the solvent are removed using a vacuum pump for 15 minutes. The glass reactor is heated up to a temperature of 250° C. and the mixture is reacted for 20 minutes. The reactor temperature is increased up to 260° C. and maintained for 10 minutes. Then, 8 mmol of Se/trioctylphosphine ("TOP") is rapidly injected into the reactor within 10 seconds, and the resulting mixture is reacted for 4 minutes. When the reaction is complete, the reactor is rapidly cooled down, and then CdSe nanoparticles are separated by using ethanol.

Figure 5:
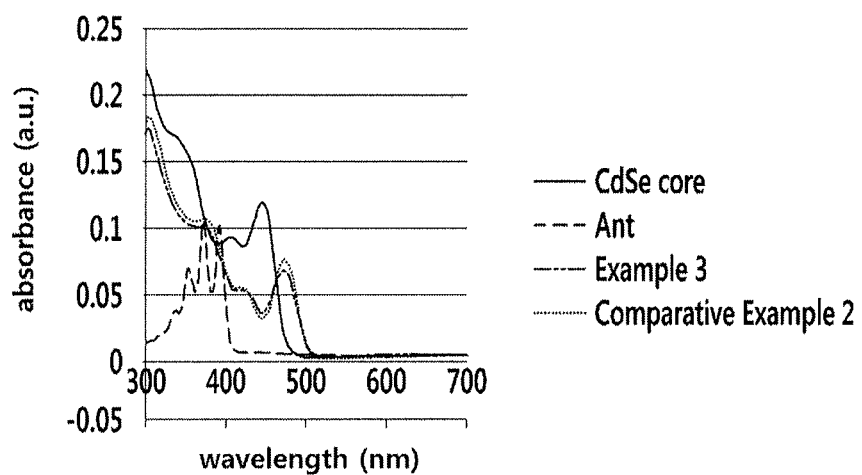
FIG. 5 is a graph of absorbance (arbitrary units, a. u.) versus wavelength (nanometer) showing the results of UV-Vis spectroscopy of the semiconductor nanocrystals synthesized according to Example 3 and Comparative Example 2.

(2) Coating a CdSe Semiconductor Nanocrystal Core with a ZnS Semiconductor Nanocrystal Shell 0.3 mmol of zinc acetate ($Zn(OAc)_2$), 0.6 mmol of oleic acid ("OA"), and 10 ml of octane are put in a pressurized reactor (1) as used in Example 1, and the air and oxygen in the reactor, the precursors, and the solvent are removed using a vacuum pump. Next, the reactor is heated up to a temperature of 100° C. When the reactor temperature reaches 100° C., the CdSe semiconductor nanocrystal prepared above (i.e., in item (1)) is rapidly injected into the reactor, and 0.6 mmol of S/TOP is slowly injected thereinto. Then, after the internal pressure of the reactor increases up to 5 bar by using nitrogen, the temperature increases up to 220° C. to conduct a reaction for about one hour. The reactant mixture is stirred at about 700 rpm throughout the reaction. FIG. 5 shows the spectrum of the solution of the synthesized semiconductor nanocrystals having a ZnS core/CdSe shell structure.

(3) The semiconductor nanocrystals of a core/shell structure obtained in the above (i.e., in item (2)) are separated in the same manner as set forth in Example 1 and the thermogravimetric analysis is conducted for them.

Figure 6:
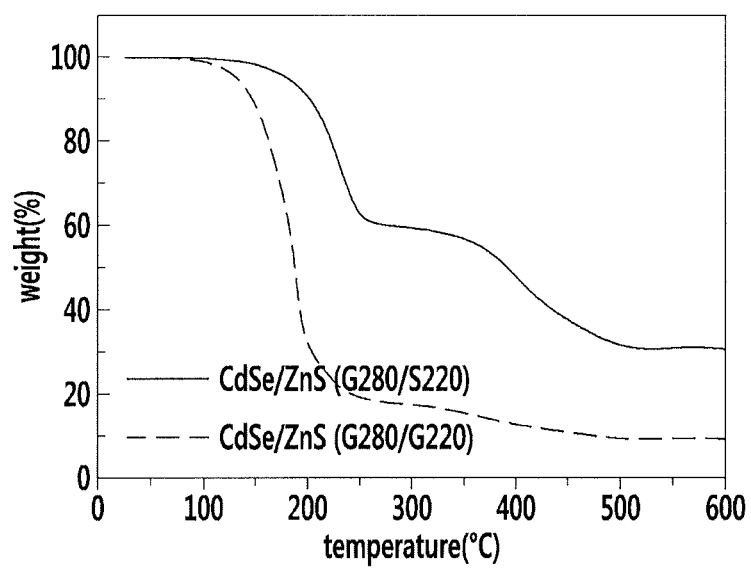
FIG. 6 is a graph of weight (percent, %) versus temperature (degree Centigrade, ° C.) showing the results of thermogravimetric analysis ("TGA") for the semiconductor nanocrystals synthesized according to Example 3 and Comparative Example 2.

The results are provided in FIG. 6 and Table 3.

(4) ICP-AES analysis is carried out for the semiconductor nanocrystals of the core/shell structure as obtained above (i.e., in the item (2)) in the same manner as set forth in Example 1, and the results are provided in the following Table 4.

(5) The semiconductor nanocrystals having a core/shell structure obtained above (i.e., in item (2)) are separated in the same method as set forth in Example 1 and their light emitting spectrum (PL spectrum) is measured. The results are provided in FIG. 7 and Table 5.

Comparative Example 2

(1) A semiconductor nanocrystal including a CdSe semiconductor nanocrystal core and a ZnS semiconductor nanocrystal shell coated thereon is prepared by using the same compounds in the same amount as in Example 1 except for using 80 ml of TOA (boiling point "bp": 330° C.), the high boiling point solvent, instead of octane at 220° C. at 1 bar.

(2) The semiconductor nanocrystal having a core/shell structure obtained in (1) is washed in the same manner as Example 1 and the thermogravimetric analysis is conducted for them. The results are provided in FIG. 6 and Table 3.

(3) ICP-AES analysis is carried out for the semiconductor nanocrystals of the core/shell structure as obtained above (i.e., in the item (1)) in the same manner as set forth in Example 1, and the results are provided in Table 4.

(4) The semiconductor nanocrystal having a core/shell structure obtained above (i.e., in item (1)) are separated in the same manner as set forth in Example 1 and their light emitting spectrum (PL spectrum) is measured. The results are provided in FIG. 7 and Table 5.

TABLE 3

| TGA | Solvent | Weight decrease rate at 500° C. (%) |
|---|---|---|
| Comparative Example 2 | Trioctylamine | 91 |
| Example 3 | Octane | 69 |

Based on the results of Table 3 and FIG. 6, the semiconductor nanocrystals of Examples 3 have an organic material content of 69% remaining on their surfaces. Such results are significantly lower than that of the nanocrystals obtained by the method of Comparative Example 2 (i.e., 91%), wherein octadecene (i.e., the high boiling point solvent) is used.

TABLE 4

| | CdSe/ZnS | | | | |
|---|---|---|---|---|---|
| ICP-AES | Cd/Se | Se/Se | Zn/Se | S/Se | Zn/Cd |
| Comparative Example 2 | 0.678 | 1.000 | 1.038 | 0.183 | 1.530 |
| Example 3 | 0.630 | 1.000 | 1.541 | 0.253 | 2.446 |

The ICP-AES results in Table 4 confirm that the nanocrystals prepared by using the low boiling solvent according to Example 3 have a similar composition to the CdSe/ZnS nanocrystals prepared by using the high boiling point solvent according to Comparative Example 2.

TABLE 5

| | Excitation by 365 nm light source | | |
|---|---|---|---|
| | Wavelength of maximum light emitting peak | Full width at half maximum | Quantum efficiency[1] |
| Comparative Example 2 | 484 | 33 | 43 |
| Example 3 | 484 | 31 | 61 |

Note
[1] a value obtained relative to an organic dye, anthracene

Figure 7:
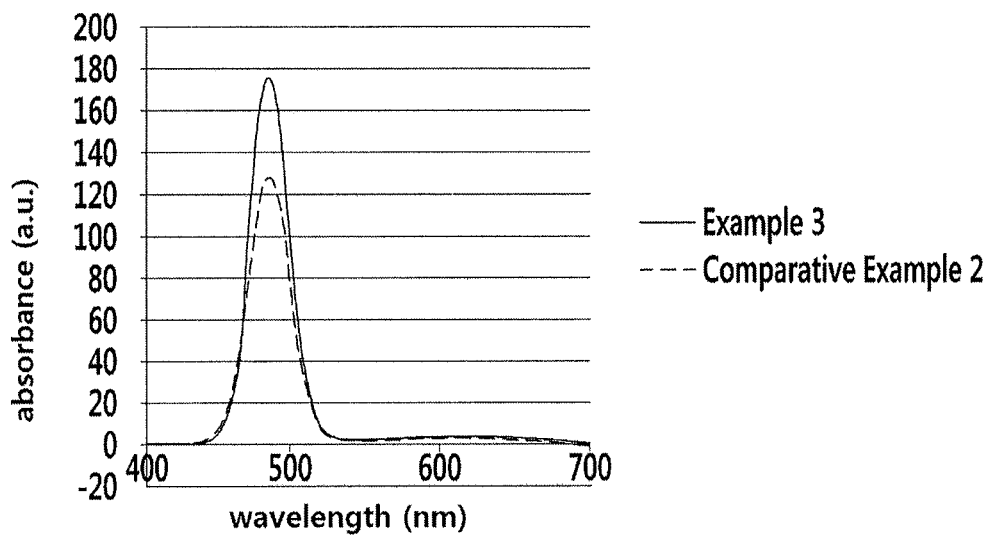
FIG. 7 is a graph of absorbance (arbitrary units, a. u.) versus wavelength (nanometer) showing the results of photoluminescence spectroscopy for the semiconductor nanocrystals synthesized according to Example 3 and Comparative Example 2.
Figure 7:
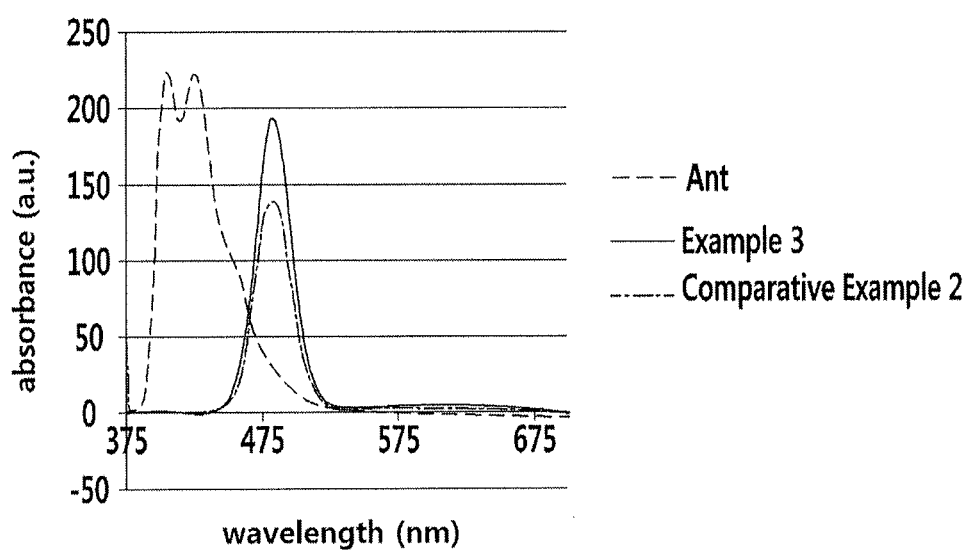

The results of FIG. 7 and Table 5 confirm that the nanocrystals prepared by using the low boiling point solvent under a pressurized condition according to Example 3 have significantly better quantum efficiency and a lower value of full width at half maximum than those of the nanocrystals prepared by using the high boiling point solvent under atmospheric pressure according to Comparative Example 2.

Example 4

Synthesis of InP(Core)/ZnS(Shell) Semiconductor Nanocrystals (1) Synthesis of InP Nanocrystal 0.2 mmol of indium acetate ($In(OAc)_3$), 0.6 mmol of palmitic acid ("PA"), and 10 ml of octadecene ("ODE") are mixed in a glass reactor and the air and oxygen in the reactor, the precursors, and the solvent are removed using a vacuum pump for 15 minutes. Then, the internal temperature in the reactor is increased up to 280° C., and 0.1 mmol of Se/TOP is injected into the reactor within 10 seconds. The resulting mixture is reacted for 60 minutes. When the reaction is complete, the reaction mixture is cooled down to room temperature, and then InP nanocrystal particles produced therein are separated using acetone.

(2) Coating InP(Core) with ZnS(Shell)

Figure 8:
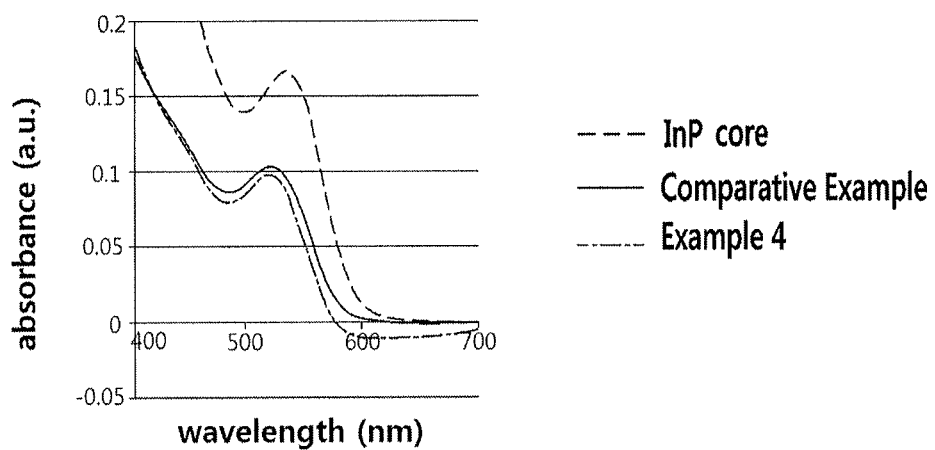
FIG. 8 is a graph of absorbance (arbitrary units, a. u.) versus wavelength (nanometer) showing the results of UV-Vis spectroscopy for the semiconductor nanocrystals synthesized according to Example 4 and Comparative Example 3.

0.3 mmol of zinc acetate ($Zn(OAc)_2$), 0.6 mmol of oleic acid ("OA"), and 10 ml of octane are put in a reactor (1), and the air and oxygen present in the reactor, precursor, and solvent are removed using a vacuum pump. Then, the temperature of the reactor is increased up to 100° C. When the reactor temperature reaches 100° C., the InP nanocrystal obtained above (i.e., in item (1)) is rapidly injected into the reactor, and 0.6 mmol of S/TOP is slowly injected therein. Then, after the internal pressure of the reactor increases up to 5 bar by using nitrogen, the temperature increases up to 220° C. to conduct a reaction for about one hour. The reactants are stirred at about 700 rpm throughout the reaction. FIG. 8 shows the absorption spectrum of the solution of the synthesized semiconductor nanocrystals of InP core/ZnS shell.

(3) The semiconductor nanocrystals of a core/shell structure obtained in the above (i.e., in item (2)) are washed in the same manner as set forth in Example 1 and the thermogravimetric analysis is conducted for them. The results are provided in FIG. 9 and Table 6.

(4) ICP-AES analysis is carried out for the semiconductor nanocrystals of the core/shell structure as obtained above (i.e., in the item (2)) in the same manner as set forth in Example 1, and the results are provided in Table 7.

(5) The semiconductor nanocrystals having a core/shell structure obtained above (i.e., in item (2)) are separated by the same method as set forth in Example 1 and their light emitting spectrum (PL spectrum) is measured. The results are provided in FIG. 10 and Table 8.

Comparative Example 3

(1) An InP core is coated with a ZnS nanocrystal shell under the same conditions as in Example 3, except for using TOA (bp 330° C.), the high boiling point solvent, and maintaining a reaction pressure at 1 bar and adopting a reaction temperature of 220° C. FIG. 8 shows the absorption spectrum for the solution of the semiconductor nanocrystals of InP core/ZnS shell structure as synthesized.

(2) The semiconductor nanocrystals of a core/shell structure obtained above (i.e., in item (1)) are separated by the same method as Example 1 and the thermogravimetric analysis is conducted for them. The results are provided in FIG. 9 and Table 6.

(3) ICP-AES analysis is carried out for the semiconductor nanocrystals of the core/shell structure as obtained above (i.e., in the item (1)) in the same manner as set forth in Example 1, and the results are provided in Table 7.

(4) The semiconductor nanocrystals having a core/shell structure obtained above (i.e., in item (1)) are separated in the same manner as set forth in Example 1 and their light emitting spectrum is measured. The results are provided in FIG. 10 and Table 8.

TABLE 6

| TGA | Solvent | Weight decrease rate at 500° C. (%) |
|---|---|---|
| Comparative Example 3 | TOA | 58 |
| Example 4 | Octane | 38 |

Figure 9:
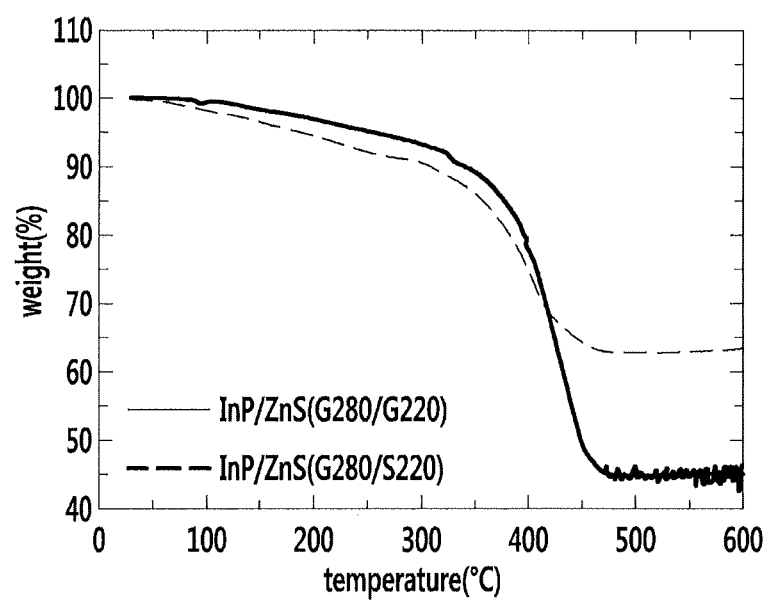
FIG. 9 is a graph of weight (percent, %) versus temperature (degree Centigrade, ° C.) showing the results thermogravimetric analysis ("TGA") of the semiconductor synthesized nanocrystals according to Example 4 and Comparative Example 3.

Based on the results of Table 6 and FIG. 9, the semiconductor nanocrystals of Examples 4 have an organic material content of 38% remaining on their surfaces. Such results are significantly lower than that of the nanocrystals obtained by the method of Comparative Example 3 (i.e., 58%), wherein trioctylamine (i.e., the high boiling point solvent) is used.

TABLE 7

| ICP-AES | Solvent | In/P | P/P | Zn/P | S/P |
|---|---|---|---|---|---|
| Comparative Example 3 | TOA | 1.015 | 1.000 | 0.604 | 0.314 |
| Example 4 | Octane | 1.032 | 1.000 | 0.8445 | 0.719 |

The results in Table 7 confirm that the InP/ZnS nanocrystals prepared by using the low boiling solvent according to Example 4 have a similar composition to the nanocrystals prepared by using the high boiling point solvent according to Comparative Example 3.

TABLE 8

| | | Excitation by 365 nm light source | | |
|---|---|---|---|---|
| | Used solvent | Wavelength of maximum light emitting peak | Full width at half maximum | Quantum efficiency[1] |
| Comparative Example 3 | TOA | 559 | 53 | 36 |
| Example 4 | octane | 557 | 50 | 49 |

Note
[1] a value obtained by comparison with an organic dye, anthracene

Figure 10A:
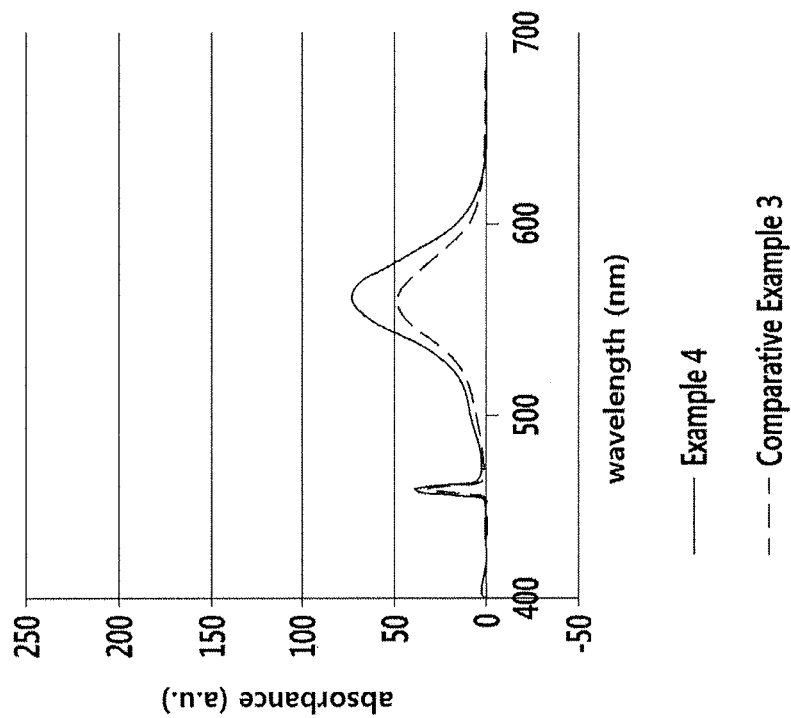
FIGS. 10A and 10B are graphs of absorbance (arbitrary units, a. u.) versus wavelength (nanometer) showing the results of photoluminescence spectrum analysis for the semiconductor nanocrystals synthesized according to Example 4 and Comparative Example 3.
Figure 10B:
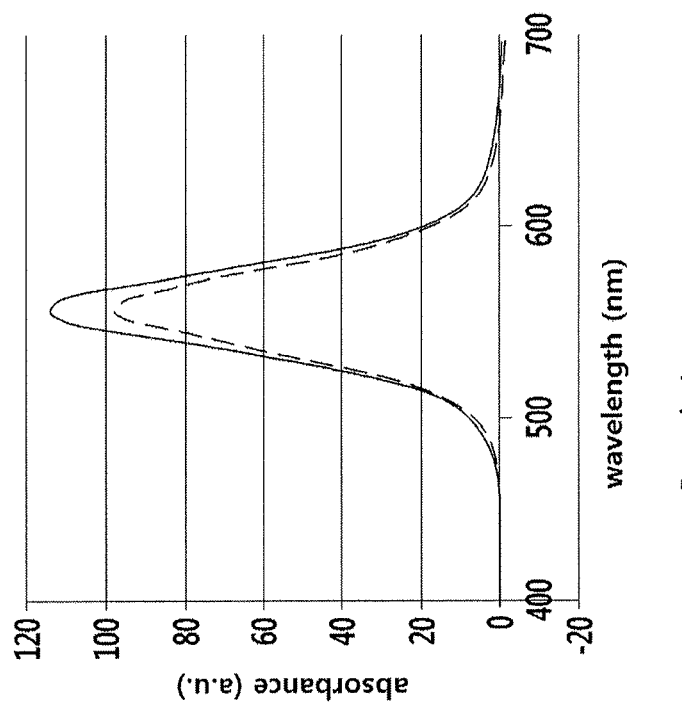

The results of FIG. 10 and Table 8 confirm that the nanocrystals prepared by using the low boiling point solvent under a pressurized condition according to Example 4 has significantly better quantum efficiency and a lower value of full width at half maximum than those of the nanocrystals prepared by using the high boiling point solvent under atmospheric pressure according to Comparative Example 3.

Example 5

1.5 mmol of 1,2-hexadecanediol, 0.249 mmol of platinum acetylacetonate, 4.2 mmol of 1-adamantanecarboxylic acid, 12 g of hexadecylamine, and 6 mL of octane are injected into a reactor, and the reactor is sealed. The reactor is heated up to 140° C., and a mixture of 0.375 mmol of $Co_2(CO)_8$ and 2.1 mL of o-dichlorobenzene (dichlorobenzene) is injected therein. The reactor is heated up to 275° C. After 30 minutes, the reactor is cooled down to room temperature, and chloroform and isopropanol are injected into the reactor. Then, a precipitate produced therein is dispersed in toluene.

EGA-MS (Thermal Evolved Gas Analyzer/Mass Spectrometer) Analysis

Figure 11:
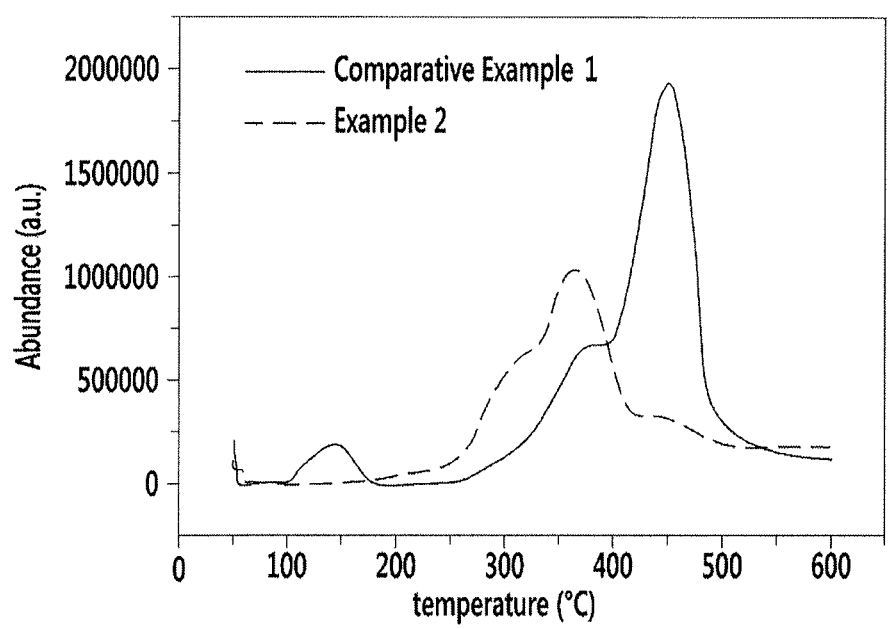
FIGS. 11 and 12 are respectively graphs of abundance (arbitrary units, a. u.) versus temperature (degree Centigrade, ° C.) and abundance (arbitrary unit, a. u.) versus mass to charge ratio showing the results of EGA-MS analysis for the semiconductor nanocrystals synthesized according to Example 2 and Comparative Example 1.
Figure 12:
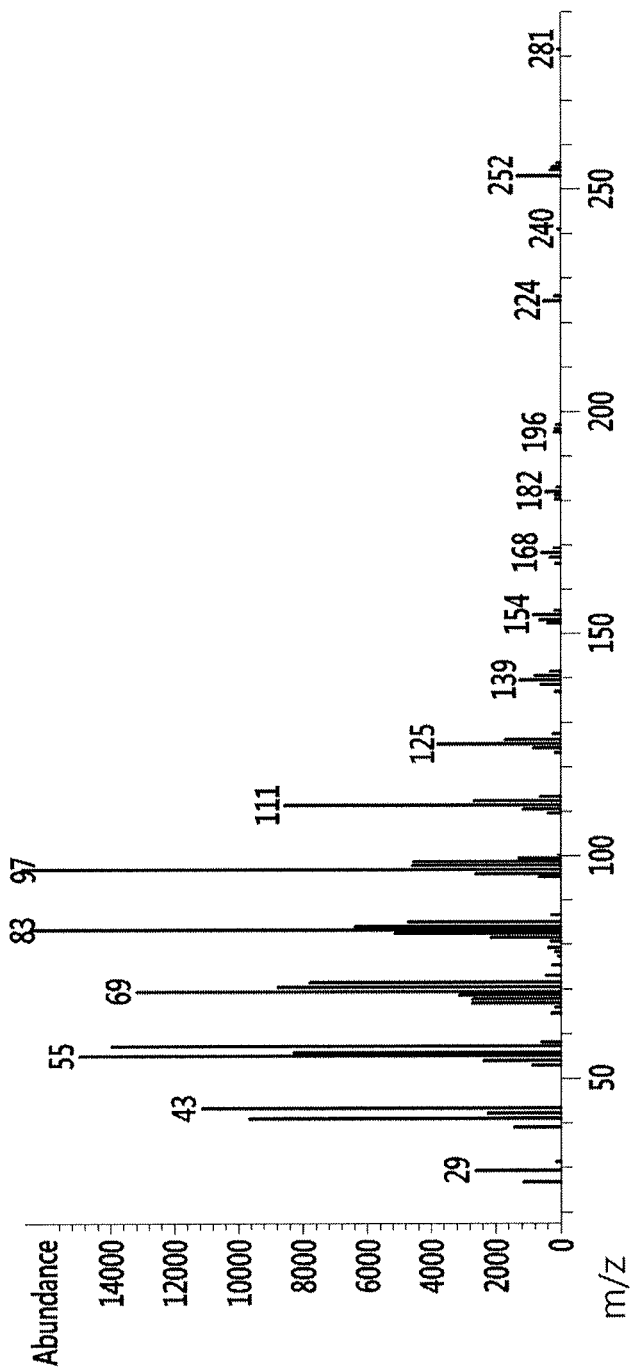

An EGA-MS analysis is conducted for the nanocrystals synthesized in Comparative Examples 1 and the nanocrystals synthesized in Example 2. Referring to the EGA data, a gas component is detected around 150° C. for the nanocrystal synthesized using ODE, the high boiling point solvent, (Comparative Example 1 in FIG. 11). The results of the mass analysis confirm that the gas component is ODE (FIG. 12). Nothing is detected below 150° C. for the nanocrystals synthesized by using toluene (i.e., a low boiling point solvent) (Example 2 in FIG. 11), and such results confirm that the nanocrystals of Example 2 include the solvent in an amount less than a detecting limit of 100 ppm.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A process of synthesizing nanocrystals, the process comprising:
   contacting a first precursor, a ligand compound, and a second precursor in a solvent having a boiling point of less than or equal to about 150° C. and a polarity index of less than or equal to 5; and
   performing a thermal decomposition reaction of the first precursor and the second precursor at a higher pressure than atmospheric pressure and at a higher temperature than a boiling point of the solvent,
   wherein the first precursor is a metal-containing precursor,
   wherein the second precursor is selected from a Group V and a Group VI precursor, and
   wherein the Group V or Group VI precursor is selected from hexanethiol, octanethiol, decanethiol, dodecanethiol, hexadecanethiol, mercaptopropylsilane, sulfur-trioctylphosphine, sulfur-tributylphosphine sulfur-triphenylphosphine, sulfur-trioctylamine, trimethylsilylsulfur, ammonium sulfide, sodium sulfide, selenium-trioctylphosphine, selenium-tributylphosphine, selenium-triphenylphosphine, tellurium-tributylphosphine, tellurium-triphenylphosphine, tristrimethylsilylphosphine, triethylphosphine, tributylphosphine, trioctylphosphine, triphenylphosphine, tricyclohexylphosphine, arsenic oxide, arsenic chloride, arsenic sulfate, arsenic bromide, arsenic iodide, nitrous oxide, nitric acid, ammonium nitrate, and a combination thereof.

2. The process of claim 1, wherein the thermal decomposition reaction is performed at a temperature of greater than or equal to about 180° C.

3. The process of claim 1, wherein the solvent is selected from an alkane having less than or equal to 10 carbon atoms, a cycloalkane having less than or equal to 9 carbon atoms, a C6 to C12 aromatic hydrocarbon, a halogenated hydrocarbon, an ether, a heteroaromatic cyclic compound, a carboxylic acid having less than or equal to 4 carbon atoms, a ketone, a sulfoxide, an amide, an alkanenitrile compound having less than or equal to 6 carbon atoms, and a combination thereof.

4. The process of claim 3, wherein the solvent is selected from pentane, hexane, heptane, octane, nonane, decane, benzene, toluene, xylene, ethylbenzene, butylbenzene, diethylether, dibutylether, dichloromethane, chloroform, carbon tetrachloride, tetrachloroethylene, ethylacetate, butylacetate, methylethylketone, and a combination thereof.

5. The process of claim 1, wherein the thermal decomposition reaction is performed at a pressure of greater than or equal to about 2 bar.

6. The process of claim 1, wherein the ligand compound is selected from RCOOH, $RNH_2$, $R_2NH$, $R_3N$, RSH, $R_3PO$, $R_3P$, ROH, RCOOR' wherein R and R' are each independently a C1 to C24 alkyl group or a C5 to C20 aryl group, and a combination thereof.

7. The process of claim 1, wherein
   the metal-containing precursor comprises a metal selected from Pd, Pt, Ni, Co, Rh, Ir, Fe, Ru, Au, Ag, Cu, a Group I metal, a Group II metal, a Group III metal, a Group IV metal, and a combination thereof, and
   the metal-containing precursor is selected from a metal, an alkylated metal compound, a metal alkoxide, a metal carboxylate, a metal nitrate, a metal chlorate, a metal sulfate, a metal acetylacetonate, a metal halide, a metal cyanide, a metal hydroxide, a metal oxide, a metal peroxide, and a combination thereof.

8. The process of claim 1, wherein the metal-containing precursor is selected from palladium acetate, palladium chloride, tetrakis(triphenylphosphine)palladium, palladium acetylacetonate, platinum chloride, platinum acetylacetonate, tetrakis(triphenylphosphine)platinum, dichloro(ethylenediamine)platinum, nickel chloride, nickel acetate, nickel sulfide, nickel sulfate, nickel nitrate, nickel acetylacetonate, cobalt chloride, cobalt carbonyl, cobalt acetate, cobalt nitrate, cobalt acetylacetonate, cobalt sulfate, chloro(1,5-cyclooctadiene)rhodium dimer, rhodium acetylacetonate, rhodium chloride, rhodium nitrate, iridium acetylacetonate, iridium chloride, iron acetate, iron chloride, iron acetylacetonate, iron nitrate, ruthenium chloride, gold chloride, trichloro(pyridine) gold, silver nitrate, silver chloride, silver acetate, silver carbonate, silver cyanate, copper chloride, copper sulfate, copper acetate, dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, trimethyl gallium, triethylgallium, gallium acetylacetonate, gallium-3-chloride, gallium fluoride, gallium oxide, gallium nitrate, gallium sulfate, indium acetate, indium hydroxide, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, and a combination thereof.

9. The process of claim 1, wherein the nanocrystal is selected from a semiconductor nanocrystal, wherein
the semiconductor nanocrystal is at least one compound selected from a Group II-VI compound, a Group III-V compound, a Group IV-VI compound, and a Group compound, and a combination thereof.

10. The process of claim 9, wherein the Group II-VI compound is selected from
a binary element compound selected from CdSe, CdTe, ZnS, ZnSe, ZnTe, ZnO, HgS, HgSe, HgTe, MgSe, MgS, and a combination thereof,
a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof, and
a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof;
the Group III-V compound semiconductor is selected from
a binary element compound selected from GaN, GaP, GaAs, GaSb, AlN, AlP, AlAs, AlSb, InN, InP, InAs, InSb, and a combination thereof;
a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof, and a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof; and
the Group IV-VI compound is selected from
a binary element compound selected from SnS, SnSe, SnTe, PbS, PbSe, PbTe, and a combination thereof, and
a ternary element compound selected from SnSeS, SnSeTe, SnSTe, PbSeS, PbSeTe, PbSTe, SnPbS, SnPbSe, SnPbTe, and a combination thereof.

11. The process of claim 1, which further comprises
adding a first nanocrystal to a mixture of the first precursor, ligand compound, and second precursor,
performing the thermal decomposition reaction in the presence of the first nanocrystal to prepare a synthesized nanocrystal,
wherein the synthesized nanocrystal comprises a core of the first nanocrystal and a shell part of a second nanocrystal disposed on the core.

12. The process of claim 11, wherein the first nanocrystal is selected from a metal nanocrystal and a semiconductor nanocrystal, wherein
the metal nanocrystal is selected from Pd, Pt, Ni, Co, Rh, Ir, Fe, Ru, Au, Ag, Cu, and a combination thereof, and
the semiconductor nanocrystal is selected from a Group II-VI compound, a Group III-V compound, a Group IV-VI compound, a Group IV compound, a Group compound, and a combination thereof.

13. The process of claim 1, which further comprises
adding a non-solvent to a product of the thermal decomposition reaction and
separating a nanocrystal to which the ligand compound is coordinated.

14. The process of claim 13, wherein the non-solvent is selected from acetone, ethanol, butanol, isopropanol, ethanediol, water, tetrahydrofuran, dimethylsulfoxide, diethylether, formaldehyde, acetaldehyde, ethylene glycol, and a combination thereof.

15. The process of claim 13, wherein the nanocrystal to which the ligand compound is coordinated has a solvent content of less than or equal to about 20 weight % based on the total weight of the nanocrystal and an organic material coordinated thereto,
wherein the organic material comprises the ligand compound and the solvent.

16. The process of claim 13, wherein the nanocrystal has a quantum efficiency of greater than or equal to about 40%, a full width at half maximum of a light emitting spectrum of less than or equal to about 50 nanometers, and a size distribution of less than or equal to about 10%.

17. A nanocrystal composition comprising a metal nanocrystal or a semiconductor nanocrystal to a surface of which a ligand compound is coordinated,
wherein the metal nanocrystal or the semiconductor nanocrystal to a surface of which the ligand compound is coordinated has a solvent content of less than or equal to about 20 weight %, based on the total weight of the nanocrystal and an organic material coordinated thereto,
the semiconductor nanocrystal comprises a core of a first nanocrystal and a shell part of a second semiconductor nanocrystal disposed on the core,
the solvent has a boiling point of less than or equal to about 150° C. and a polarity index of less than or equal to 5,
wherein the first nanocrystal is selected from a metal nanocrystal and a semiconductor nanocrystal, wherein the metal nanocrystal is selected from Pd, Pt, Ni, Co, Rh, Ir, Fe, Ru, Au, Aq, Cu, and a combination thereof, and the semiconductor nanocrystal is selected from a Group II-VI compound, a Group III-V compound, a Group IV-VI compound, a Group IV compound, a Group compound, and a combination thereof,
the second semiconductor is at least one compound selected from a Group II-VI compound, a Group III-V compound, a Group IV-VI compound, a Group IV compound, and a Group compound, and a combination thereof, and
wherein the organic material comprises the ligand compound and the solvent.

18. The nanocrystal composition of claim 17, wherein the metal nanocrystal or the semiconductor nanocrystal has a full width at half maximum of less than or equal to about 50 nanometers, a size distribution of less than or equal to about 10%, and a quantum efficiency of greater than or equal to about 40%.

19. The nanocrystal composition of claim 17,
wherein the metal nanocrystal is selected from Pd, Pt, Ni, Co, Rh, Ir, Fe, Ru, Au, Ag, Cu, and a combination thereof,
the semiconductor nanocrystal is selected from a Group II-VI compound, a Group III-V compound, a Group IV-VI compound, a Group IV compound, a Group compound, and a combination thereof, and
the ligand compound is selected from RCOOH, $RNH_2$, $R_2NH$, $R_3N$, RSH, $R_3PO$, $R_3P$, ROH, RCOOR' (wherein R and R' are each independently a C1 to C24 alkyl group or a C5 to C20 aryl group), and a combination thereof.

* * * * *